US008372898B1

United States Patent
Bogale et al.

(10) Patent No.: US 8,372,898 B1
(45) Date of Patent: Feb. 12, 2013

(54) AQUEOUS CYAN INKJET INK COMPOSITION CONTAINING A MIXTURE OF A SELF-DISPERSED PIGMENT AND A SPECIFIC COSOLVENT MIXTURE

(75) Inventors: Rahel Bekru Bogale, Lexington, KY (US); Susan Hardin Butler, Lexington, KY (US); Ann P. Holloway, Lexington, KY (US); Qi Yin, Lexington, KY (US); Agnes Kam Zimmer, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 13/433,327

(22) Filed: Mar. 29, 2012

(51) Int. Cl.
  *C09D 11/10* (2006.01)
(52) U.S. Cl. ..................... 523/160; 524/377
(58) Field of Classification Search .............. 524/377; 523/160, 161
  See application file for complete search history.

(56) References Cited

U.S. PATENT DOCUMENTS

| | | | |
|---|---|---|---|
| 6,225,370 B1 | 5/2001 | Suthar |
| 6,638,350 B2 | 10/2003 | Butler |
| 6,652,634 B1 | 11/2003 | Akers, Jr. |
| 6,843,838 B2 | 1/2005 | Zimmer |
| 7,001,936 B2 | 2/2006 | Akers, Jr. |
| 7,066,991 B2 | 6/2006 | Blease |
| 7,429,293 B2 | 9/2008 | Cai |
| 8,188,158 B2 | 5/2012 | Bertelsen |
| 2004/0048745 A1 | 3/2004 | Kitamura |
| 2005/0187312 A1 | 8/2005 | Akers, Jr. |
| 2007/0043144 A1 | 2/2007 | House |
| 2007/0078199 A1 | 4/2007 | Winkler |
| 2009/0068417 A1 | 3/2009 | Saito |
| 2010/0285219 A1 | 11/2010 | Cai |

*Primary Examiner* — Vu A Nguyen

(57) ABSTRACT

The invention relates to an aqueous cyan inkjet ink composition for use in ink jet printers comprising an aqueous carrier, a self dispersed cyan pigment, a polymeric additive, a surfactant, and a specific cosolvent mixture comprising a $C_2$-$C_8$ terminal alkanediol, a cyclic amide compound and its derivative, a polyol/polyalkylene oxide condensate, and a trihydric alcohol. Preferably, the self dispersed cyan pigment is surface modified with bisphosphonate group. The cyan inkjet ink demonstrates excellent stability, superior chroma, good printhead maintenance characteristics and high heater reliability in permanent and semi permanent printheads.

12 Claims, No Drawings

AQUEOUS CYAN INKJET INK COMPOSITION CONTAINING A MIXTURE OF A SELF-DISPERSED PIGMENT AND A SPECIFIC COSOLVENT MIXTURE

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

The present invention pertains to a cyan ink for inkjet printing and in particular to a cyan ink having a mixture of specific cosolvents formulated with a self-dispersed cyan pigment. The self-dispersed pigment is defined as cyan pigment surface modified with bisphosphonate group or sulfonate functional group.

Ink jet printing is accomplished by ejecting ink from a nozzle toward paper or another print medium. The ink may be driven toward the medium in a variety of ways. For example, in electrostatic printing, the ink is driven from a nozzle toward a medium by an electrostatic field. Another ink jet printing procedure, known as squeeze tube, employs a piezoelectric element in the ink nozzle. Electrically-caused distortions of the piezoelectric element pump the ink through the nozzle and toward the print medium. In still another ink jet printing procedure, known as thermal or bubble ink jet printing, the ink is driven from the nozzle toward the print medium by the formation of an expanding vapor phase bubble in the nozzle. These various printing methods are described in "Output Hard Copy Devices," edited by Durbeck and Sherr, Academic Press, 1988 (see particularly chapter 13, entitled "Ink Jet Printing").

Ink jet printers are well known. One common type of ink jet printer uses a replaceable print cartridge having a printhead and a supply of ink contained within the cartridge. The printhead is installed in a printhead carrier, which positions the printhead along a printing zone. When the supply of ink contained within the print cartridge is depleted, the print cartridge is disposed of and a new print cartridge is installed in the printhead carrier. In contrast, off-carrier inkjet printers deliver ink through supply tubes connected from a replaceable off-carrier ink supply tank to an ink jet printhead positioned on the printhead carrier. This inkjet printhead is not disposable but permanent or semi-permanent in nature. Naturally consumers expect that these permanent or semi-permanent printheads have a longer life compared to a disposable printhead. When the supply of ink is exhausted, the consumer will purchase a new tank filled with ink as opposed to purchasing a brand new printhead containing the same supply of ink. Purchasing a tank of ink is a more economical option for the consumer. Therefore it is imperative that a permanent or semi-permanent printhead does not fail in their operations prematurely because consumers expect that permanent and semi-permanent printheads will have a longer life compared to a disposable printhead.

Ink being jetted over the life of permanent or semi-permanent printheads can cause many problems which affect the overall performance of the printhead. One of the most common problems is kogation. During the firing of millions of ink drops from the printhead, the layer of ink covering the surface of the heating element of the printhead can reach a very high temperature, usually over 300° C. At this high temperature, ink can decompose, thereby depositing a residue onto the surface of the heater. This phenomenon is called kogation. The presence of this residue negatively affects the volume, mass, shape and velocity of each ejected drop of ink jetted from the printhead, thereby reducing the quality and the expected life of a thermal inkjet printhead. A loss of drop mass over the life of the printhead negatively reduces the accuracy of drop placement onto the print media. In extreme cases, kogation causes the printhead to stop working altogether. Therefore, it is necessary to have an ink that does not cause the undesirable kogation in a printhead.

Another undesirable problem is reduced idle time (decap time). Idle time is used to measure the short term reliability of an ink. Idle time is measured as the time between nozzle firings just before the printhead produces delayed or misdirected ink droplets. It affects the maintenance algorithm of the printer which in turn affects the through-put and how much ink will be used during the maintenance of the printhead. Often cyan inks exhibit poor idle times.

Post print paper curl is also an issue especially during fast speed printing. The use of water in high concentrations in inkjet ink formulations induces the water to negatively react with the paper, thereby causing the edges of the paper to migrate towards the center of the paper. Curl may appear immediately after printing or it may take a couple of days to manifest itself. In its final state, the paper may curl so much that it resembles a roll, scroll or a tube. Curled paper cannot be stacked nor can it successfully be duplexed in a print job.

In order to reduce paper curl it is helpful to understand the mechanism of paper curl and determine which particular ink components have an effect on this paper curl. Media tends to curl after a large quantity of ink is deposited onto the surface of the printing substrate. Plain paper substrates are comprised mainly of cellulose fibers, along with varying levels of inorganic fillers. It is the interaction of the water in the inkjet inks with these cellulose fibers that leads to the phenomenon of paper curl. The absorption of water by the cellulose fibers causes swelling and then breaking of the interfiber cellulose bonds in the paper.

Upon drying there are differential stresses between the printed and non-printed surfaces. These differential stresses manifest themselves as paper curl, whereby the substrate tends to curl towards the surface from which moisture was last removed (the imaged surface). An ink formulation with a reduced level of water in addition to humectants with high boiling points effectively eliminates the typical end user problems of stacking and displaying printed images with acceptable levels of paper curl.

Ink formulations used in ink jet printers comprise either a soluble dye or an insoluble pigment. Unfortunately, inks comprising soluble dyes can exhibit many problems, such as poor water-fastness, poor light-fastness, clogging of the jetting channels as a result of solvent evaporation and changes in the dye's solubility, dye crystallization, poor print quality including ink bleeding and feathering, poor thermal stability, chemical instability, and ease of oxidation.

Pigmented inks are also not problem free. For example, insoluble pigments must be present in the ink as a dispersion. Unfortunately, traditional polymeric dispersed pigmented ink is not vibrant due to its penetration into fibers on plain and Colorlok® papers. Another problem with pigmented ink is the propensity of the ink particles to settle during storage. This can lead to clogged nozzles and poor print quality.

As discussed above, it has been very difficult to develop a cyan ink formulation which optimizes all of these desired ink printing properties simultaneously. Therefore, many trade-offs arise when trying to formulate an acceptable cyan ink formulation. Often the inclusion of an ink component meant to fix and or control one of the above discussed problems can prevent another printing property from being met.

Prior to the present invention, however, an ink formulation which optimizes all of these desired ink printing properties had not been achieved. For example, increasing the pigment load in the inkjet ink formulation improves the optical density and gamut of the ink but it also has a negative impact on jetting and heater kogation. Many solvents help kogation but they negatively increase the viscosity of the ink. A certain viscosity value is vital, especially when the ink is used in an off-carrier printer. Low viscosity inks flow easily through the off carrier tubing in addition to penetrating quickly into the print media resulting in quick drying images. Usually a desirable cyan ink viscosity at 25 C.° is in the range of 2.2-3.0 cps. However, many solvents and antikogation agents negatively increase the viscosity of the ink. This causes great difficulty in jetting the ink, especially after the printhead is idle, and consequently leads to clogging of the printhead, difficulty in jetting the ink and ultimately to the printhead failing prematurely.

Humectants (also termed cosolvents) can be added to the ink composition to aid in maintaining the colorant in the ink composition and to enhance the performance of the ink. However, often the addition of particular humectants can negatively impact the print quality of the ink. Unfortunately, high quantities of humectants adversely affect the cyan ink in terms of viscosity, dry time and smudging. Consequently, there is a need to balance these competing factors when deciding exactly which components to include and at what percentage each component should be used in a cyan ink formulation, wherein the ink formulation would minimize kogation and paper curl and improve idle time while still having acceptable print quality and print properties. The cyan inkjet ink of the present invention balances these many trade-offs to formulate an optimized cyan inkjet ink formulation.

The cyan ink of the present invention uses a combination of a particular cyan colorant with a unique cosolvent mixture which surprisingly produces an optimal ink formulation which minimizes kogation, has acceptable print quality and viscosity and reduces printer maintenance problems (i.e., minimized clogging of the printhead during gaps in printer usage) and maintains the life of the printhead. With the increased usage of off carrier inkjet printing systems having permanent and semi-permanent printheads, this type of cyan inkjet ink formulation is greatly needed.

It is, therefore, an object of the present invention to provide an improved cyan pigmented ink composition for ink jet printers having optimal chroma, gamut value and viscosity while simultaneously reducing paper curl and kogation and improving idle time. The cyan inkjet ink of the present invention is especially suitable for use in permanent or semi permanent printheads. Other objects and advantages of the present invention will become apparent from the following disclosure.

SUMMARY OF THE INVENTION

The present invention relates to a cyan ink composition suitable for use in ink jet printers comprising a specific mixture of a self-dispersed cyan pigment and a specific mixture of humectants including:

1) a $C_2$-$C_8$ terminal alcohol;
2) a polyol/alkylene oxide condensate;
3) a trihydric alcohol and;
4) a cyclic amide.

In particular, the self-dispersed cyan pigment is surface modified with either bisphosphonate group or sulfonate group. Most preferred is a cyan pigment surface modified with bisphosphonate group. The cyan ink of the present invention also includes a surface active polymer (hereinafter referred to as "polymeric additive"), a surfactant and the balance an aqueous carrier. Optionally, the cyan inkjet ink of the present invention may contain a biocide.

All percentages used herein are "by weight" unless otherwise specified and are based on the overall cyan inkjet ink composition. All molecular weights, used herein, are number average molecular weights unless otherwise specified.

DETAILED DESCRIPTION OF THE INVENTION

The first component of the cyan ink composition of the present invention is the self-dispersed cyan pigment. The cyan self-dispersed pigment is present in the inkjet ink composition of the present invention at from about 1.0% to about 5.0%, most preferably about 3.0% of the total cyan inkjet ink composition. Indeed, one of the important advantages of the present invention is that it allows formulation of inks having low levels of pigment (e.g., between 0.5% and 5.0%) while still providing print of high quality and excellent optical density.

Pigments known as self-dispersed pigments are created with a surface modification. Such pigments can be surface modified in a variety of ways including, but not limited to, treatments with alkali salts of hypochlorite, ozone, and diazonium salts of aromatic sulfonic acid additions. These surface modified pigments have the distinct advantage of being self-dispersed in aqueous media and can be used without a corresponding polymeric dispersing agent. U.S. Publication 2007/0100024 describes a preferred method of making a self-dispersed cyan pigment having (or modified) with bisphosphonate functional group and the disclosure is incorporated by reference. Cyan pigment surface modified with sulfonate group are also useful. Commercially available cyan pigments surface modified with bisphosphonate functional group or sulfonate functional group are manufactured by Cabot Corporation and sold under the trade name Cab-O-Jet® 250C and Cab-O-Jet® 450C. The preferred cyan pigment is surface modified with bisphosphonate group, trade name Cab-O-Jet® 450C.

Table 1 below compares the color data of the cyan ink of the present invention (Ink A) to a cyan ink formulated with an insoluble pigment (Ink B). Higher chroma (or C*) indicates high color vibrancy. A higher numerical gamut volume is desirable. The CIELAB b* values describe the yellowness against the blueness of a printed image with the more positive values indicating a tendency toward greater yellowness and a more negative value indicating a tendency towards blueness. CIELAB a* values compare greenness against redness, where more positive values indicate a higher proportion towards redness and a more negative value indicate a tendency towards greenness. A greener cyan is preferred by consumers. Therefore, it is desirable for a cyan ink to have more negative a* and b* values. CIELAB L* or luminosity is a measure of how much light is transmitted from an object to the eye. L*, a*, and b* measurement techniques are described by Billmeyer and Saltzman, Principles of Color Technology, 2$^{nd}$ Edition, Chapter 3. It can be seen in Table 1 that the inventive cyan ink (Ink A) has more desirable L*, a*, b*, gamut volume and C* values than the prior art polymeric dispersed pigmented cyan ink (Ink B). Moreover, the prior art polymeric dispersed pigmented cyan ink failed the fiber show through test.

TABLE 1

| Ink | L* | a* | b* | C* | Gamut Volume plain paper w/Colorlok ® | Fiber show through test |
|---|---|---|---|---|---|---|
| Ink A | 59.6 | −16.4 | −44.5 | 47.4 | 204K | Pass |
| Ink B | 56.8 | −6.8 | −44.9 | 45.4 | 186K | Fail |

| Ink A Formulation | | Ink B Formulation | |
|---|---|---|---|
| Cab-O-Jet ® cyan pigment surface modified with bisphosphonate group | 3.5% | Cyan pigment dispersion | 4.0% |
| Polymeric additive | 0.5% | | |
| 1,3-propanediol | 10.0% | Glycerol | 10.0% |
| 1-(2-hydroxyethyl)-2-Pyrrolidone | 6.0% | Tripropylene glycol | 6.0% |
| Trimethylolpropane | 2.0% | Triethylene glycol | 4.25% |
| Polyol ® 3165 | 2.0% | | |
| Surfynol ® 465 | 0.75% | Surfynol ® 465 | 0.75% |
| Biocide | 0.15% | Biocide | 0.15% |

Another component for use in the cyan inkjet ink composition of the present invention is the unique cosolvent mixture present in the amount of about 15.0% to about 25.0%, most preferably about 20.0% based on the overall total weight of the cyan inkjet ink composition.

This cosolvent mixture contains a first component comprising one $C_2$-$C_8$ terminal alkanediol. A $C_2$-$C_8$ terminal alkanediol is defined to mean a diol having hydroxyl group at each end like, for example, an alkanediol having the formula:

$$HO-CH_2(CH_2)_tCH_2-OH,$$

wherein t is about 0 to about 6.
Suitable terminal alkanediols include 1,3-propanediol, 1,4-butanediol, 1-5,-pentanediol, 1,6-hexanediol, 1,7-heptanediol and mixtures thereof. The most preferred terminal alkanediol is 1,3-propanediol. The amount of the terminal alkanediol to be used is from 5.0% to 15.0%, most preferably about 10.0%, based on the total weight of the cyan inkjet ink composition.

The second component used in this cosolvent mixture is a trihydric alcohol. Some examples of trihydric alcohols include glycerol and trimethylolpropane. Various tests indicate that a mixing of trihydric alcohols has an adverse effect on jetting. Trimethylolpropane is the most preferred trihydric alcohol. The amount of the trihydric alcohol to be used is from about 1.0% to 5.0%, most preferably about 2.0%, based on the total weight of the cyan inkjet ink composition.

The third component in the cosolvent mixture is a polyol/alkylene oxide condensate having the formula:

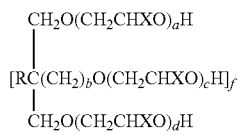

$$\begin{array}{c} CH_2O(CH_2CHXO)_dH \\ | \\ [RC(CH_2)_bO(CH_2CHXO)_cH]_f \\ | \\ CH_2O(CH_2CHXO)_dH \end{array}$$

wherein X is H or $CH_3$, R is H, $C_1$-$C_4$ alkyl or $-CH_2O(CH_2CH_2O)_eH$, b is 0 or 1, a+d+f (c+e) is from about 2 to about 100, and f is from about 1 to about 6.

The polyol/alkylene oxide condensate compounds useful in the present invention are reaction products of a polyol and an alkylene oxide. They are described in U.S. Pat. No. 5,180,425, Matrick, et al., issued Jan. 19, 1993, incorporated hereby reference. These compounds generally have solubility in water of at least about 4.5% (i.e., 4.5 parts in 100 parts of water) at 25° C. The alkylene oxide used in these compounds is either ethylene oxide or propylene oxide or combinations of both oxides. Reaction with a single alkylene oxide can produce mixtures of compounds with varying degrees of oxyalkylation so that the structures illustrated are based on average compositions which may contain a range of alkylene oxide units. Random and block copolymer chains of propylene and ethylene oxides may be employed. The polyol reacted with the alkylene oxide may contain three or more hydroxyl group. Useful triols are glycerol, trimethylolpropane and trimethylolethane.

Some examples of polyol/alkylene oxide condensates are as follows:

a+d+f

| Product | R | (c + e) | b | f |
|---|---|---|---|---|
| Liponic ® EG-1[1] | —H | 26 | 0 | 1 |
| Liponic ® SO-20[1] | —H | 20 | 0 | 4 |
| Photonol ® PHO-7149[2] | —$C_2H_5$ | 2.7 | 1 | 1 |
| Voranol ® 230-660[3] | —$CH_3$ | 3.0 | 1 | 1 |
| Polyol ® 3165[4] | —$C_2H_5$ | 14-18 | 1 | 1 |

[1]Lipo Technologies
[2]Cognis
[3]Dow Chemical Co.
[4]Perstorp Specialty Chemicals AB A particularly preferred polyol/alkylene oxide condensate for use in the present invention is Polyol® 3165, described above, wherein x is hydrogen, R is $C_2H_5$, b is 1, f is 1 and a+d+f (c+e) is 14-18. The amount of the polyol/alkylene oxide condensate to be used is from 0.5% to 4.0%, most preferably about 2.0%, based on the total weight of the cyan inkjet ink composition.

The fourth component of the unique cosolvent mixture is a cyclic amid compound such as cyclic amides, substituted cyclic amides and cyclic amide derivatives. The cyclic amide compound may be selected from the group consisting of 2-pyrrolidone, 1-methyl-2-pyrrolidine, 1,5-dimethyl-pyrrolidone, 1-ethyl-2-pyrrolidone, 1-propyl-2-pyrrolidone, 1-isopropyl-2 pyrrolidone, 1-butyl-2-pyrrolidone, 1-(2-hydroxyethyl)-2-pyrrolidone, 1-methyl-2-piperidone, 1-methylcaprolactum, oenantholactum and mixtures thereof. One useful cyclic amide compound is 2-pyrrolidone. The most preferred cyclic amide compound is 1-(2-hydroxyethyl)-2-pyrrolidone. The amount of the cyclic amide compound to be used is from 5.0% to 10.0%, most preferably about 6.0%, based on the total weight of the cyan inkjet ink composition.

The addition of a small amount of a polymeric additive is found useful in the cyan inkjet ink formulation. Polymeric additives suitable for use in the present invention include any of the anionic, cationic or nonionic polymerics known in the art as suitable for use as polymeric additive in ink jet ink preparations. The amount of the polymeric additive added to the ink formulation must not affect properties of the ink such as viscosity, stability and optical density. The cyan ink composition of the present invention contains a polymeric additive in the amount from about 0.1% to about 2.0%, most preferably about 0.5%, based on the overall total weight of the cyan inkjet ink composition.

The polymeric additive is a graft co-polymer, preferably a terpolymer made by a free radical polymerization process. It preferably contains three monomers or components: namely a hydrophilic component, a hydrophobic component and a protective colloid component. The ratio of the three monomers can vary. The preferred ratio of the hydrophilic component:the hydrophobic component:the protective colloid component can range from 5:1:1 to 40:2:1, preferably 6.2:1:1, most preferably, 15:1:1. This polymeric additive and its polymerization is more particularly described in U.S. Pat. Nos. 6,652,634 and 6,896,724 assigned to the assignee of the present invention and the disclosures in their entirety are herein incorporated by reference.

The hydrophilic component of the polymeric additive is preferably an ionic monomer segment which may be selected from acrylic acid, methacrylic acid, crotonic acid, or other acid containing monomers. The hydrophilic segment preferably provides polymeric additive electrostatic stability. Particularly preferred is a methacrylic acid (MAA).

The hydrophobic component of the polymeric additive preferably contains non-polar functionality. Preferred group that provide the electron rich functional group include nonylphenyl, mono-, di-, and tri-styrene phenol, polydimethylsiloxy, and stearyl. Examples of such monomers include, but are not limited to, polymerizable monofunctional vinyl monomers from Toagosei Co. of Tokyo, Japan under the trade name Aronix M-117, mono-methacryloxypropyl terminated polydimethylsiloxane from Chisso Corporation of Tokyo, Japan. Non-siloxyl hydrophobic monomers may be derived from long chain aliphatic group, long chain alcohols, and alkyl aryl alcohols. Examples of such materials preferably include stearyl or methacrylate or nonyl phenol acrylate or methacrylate. The most preferred hydrophobic component is polypropylene glycol nonylphenylether acrylate (Aronix M-117).

Another important component of the polymeric additive is the protective colloid component. This component provides extra stability to the ter-polymer in an aqueous system. Use of this component substantially reduces the amount of ionic monomer component needed, thereby increasing the non-ionic water solubility of the polymeric additive. Preferred protective colloid segment is poly (ethylene glycol) 2,4,6-tris-(1-phenylethyl)phenyl ether methacrylate (Sipomer SEM-25) and its di and mono derivatives wherein the alkylene group contains from 3 to 10 carbon atoms. This type of monomer is commercially available from Rhodia, USA of Cranbury, N.J. under the trade name SIPOMER/SEM 25.

A particularly useful polymeric additive available from Lexmark International®, Inc. is an acrylic terpolymer having moieties of methacrylic acid (MAA); poly (propylene glycol)-4-nonylphenyl ether acrylate (Aronix M-117); and poly (ethylene glycol) 2,4,6-tris-(1-phenylethyl)phenyl ether methacrylate (Sipomer SEM-25). In exemplary embodiments, the molar ratio of MAA:Aronix M-117:Sipomer SEM-25 ranges from 4:1:1 to 40:2:1. In the most preferred embodiment, the molar range of the MAA:Aronix M-117:Sipomer SEM-25 is 15:1:1. Alternatively, the ratio of MAA:Aronix M-117:Sipomer SEM-25 is 6.2:1:1. This polymeric additive and its polymerization is more particularly described in U.S. Pat. Nos. 6,652,634 and 6,896,724 assigned to the assignee of the present invention.

Another useful polymeric additive is a graft polymer having both an anionic hydrophilic monomer and a hydrophobic aromatic monomer. The hydrophilic monomer can be any carboxylic acid containing vinyl, acrylic or methacrylic molecule which is typically used in radical polymerization. Examples are methacrylic acid or acrylic acid. The hydrophobic monomer can be any phenyl containing monomer of the type including acrylic, methacrylic, vinyl or styrene that is typically used in radical polymerization. An exemplary polymeric additive of this type is a copolymer manufactured by Lexmark International®, Inc. using methacrylic acid for the hydrophilic component and benzyl methacrylate for the hydrophobic component. The molar ratio of the methacrylic acid to the benzyl methacrylate is 1:1. Another useful polymeric additive is a terpolymer using styrene and alpha-methyl styrene in the hydrophobic component and acrylic acid in the hydrophilic component of the terpolymer. This terpolymer is sold by BASF Company under the trade name Joncryl® HPD 671. Another useful polymeric additive, manufactured by Lexmark International®, Inc. is described in U.S. Pat. Nos. 5,714,538 and 5,719,204 assigned to the assignee of this invention.

Another component of the cyan inkjet ink composition is a surfactant added to adjust the surface tension of the ink. The surfactant can be anionic, or nonionic. The surfactant is present at a level of about 0.5% to about 2.0%, most preferably about 0.75%, based on the overall total weight of the cyan inkjet ink composition. Suitable surfactants include, but are not limited to those of the Triton® and Tergitol® series (Dow Chemical Corporation); those of the Surfynol® series and Dynol Series® (Air Products, Inc.); and those of the Iconol® series (BASF Co.). The most preferred surfactant is ethoxylated 2,4,7,9-tetramethyl-5decyn-4,7-diol sold under the trade name Surfynol®465. Other desired chemical additives such as biocides, pH buffers, chelating agents (EDTA) and the like can also be optionally used in the cyan ink of the present invention. The balance of the cyan inkjet ink of the present invention is an aqueous carrier medium, usually water, preferably deionized water.

The cyan ink composition of the present invention may be prepared by any method known in the art for making such compositions. In one embodiment, the ink is prepared as follows.

1. Premix the polymeric additive with DI water by mechanical stirring until mixture is homogeneous for at least 10 minutes.
2. Add the cosolvents and surfactants while stirring and mix for 20 minutes.
3. Slowly add the cyan pigment dispersion while stirring and mix for 20 minutes.
4. Biocides and optional additives at their art-established levels to achieve their art known benefits can be added.

5. Filter the final ink to 1 um using depth style filters constructed of polypropylene.

The following examples are detailed descriptions of methods of preparation and use of the ink compositions of the present invention. The detailed descriptions fall within the scope of, and serve to exemplify, the more general description set forth above. The examples are presented for illustrative purposes only, and are not intended as a restriction on the scope of the invention.

A cyan ink composition having the mixture of the pigment surface modified with bisphosphonate group in combination with the unique cosolvent group demonstrates optimal printing properties including good print head maintenance, good uncap start up, resistance to kogation and good print quality. Various cyan inkjet inks were formulated as outlined in Table 2 Ink #1 is the inventive cyan ink of the present invention.

TABLE 2

| Ink Compositions | Ink #1 | Ink #2 | Ink #3 | Ink #4 | Ink #5 |
|---|---|---|---|---|---|
| 1-(2-hydroxyethyl)-2-Pyrrolidone | 6.0% | | | | |
| 1,3-propanediol | 10.0% | | | 6.5% | 9.0% |
| Trimethylolpropane | 2.0% | | | | |
| Tri(propylene glycol) | | | 7.0% | | |
| Tetraethylene glycol | | | 5.0% | | |
| Glycerol | | | | 5.0% | |
| 1,2 propanediol | | | | 10.0% | 6.5% | 9.0% |
| Polyol ® 3165 | 2.0% | | | 2.0% | 2.0% |
| Liponic ® EG1 | | 3.0% | | | |
| Polymeric additive | 0.5% | 0.6% | 0.5% | 0.5% | 0.5% |
| Cabot cyan pigment surface modified with bisphosphonate group | 3.0% | 3.0% | 3.0% | 3.5% | 3.5% |
| Biocide | .15% | .15% | .15% | .15% | .15% |
| Surfynol ® 465 | .75% | .75% | .75% | .75% | .75% |

The inks prepared in Table 2 were tested for their performance in different categories and Table 3 lists the results of these tests. As can be seen in Table 3, the inventive cyan ink (Ink#1) having the unique combination of a cyan pigment surface modified with bisphosphonate group in combination with the unique cosolvent mixture of the present invention was the only one of the 5 cyan inks tested to pass all 4 print quality tests including print head maintenance, start up, kogation and print quality.

TABLE 3

| Test Results | Ink #1 | Ink #2 | Ink #3 | Ink #4 | Ink #5 |
|---|---|---|---|---|---|
| Print head Maintenance | Good | Poor | Good | Good | Good |
| Startup | Good | Poor | Poor | Poor | Poor |
| Kogation | Good | Good | Poor | Good | Good |
| Print Quality | Good | Poor | Poor | Poor | Poor |

Another test performed on two different cyan inks was 'Paper Curl'. Paper curl occurs when the fibers within a sheet of paper expand or contract unevenly as the ink dries. This uneven shrinkage or expansion produces a bent or curled paper structure. Ink formulation is one of the most important variables of paper curl. The paper curl experiment began by studying two important factors: the print out of the image on the paper and the type of paper involved (plain, Colorlok® and recycled). The testing of paper curl determined that the worst and consistent curl was found on the Hammermill® Laser Print paper having a heavy coverage image printed thereon. The inventive cyan ink (listed as Ink A on Table 4), was tested for paper curl against a cyan prior art ink (listed as Ink C on Table 4). Lower curl numbers in millimeters are desired. Results reported in Table 4 below show that the inventive cyan ink formulation has a reduction in paper curl by almost 50.0% when compared to the Ink C.

TABLE 4

| TIME (minutes) | POST PRINT CURL (mm) INK A | POST PRINT CURL (mm) INK C |
|---|---|---|
| 5 | 16 | 17.7 |
| 10 | 18.3 | 21.7 |
| 15 | 20.4 | 26.3 |
| 20 | 21.2 | 28.3 |
| 25 | 21.67 | 28.5 |
| 30 | 22.4 | 30 |
| 35 | 22.9 | 30.7 |
| 40 | 22.7 | 31.3 |
| 60 | 25.8 | 37.1 |
| 120 | 29.8 | 37.1 |
| 240 | 33.9 | 43 |

TABLE 5

| Ink A Formulation | | Ink C Formulation | |
|---|---|---|---|
| DI Water | balance | DI Water | balance |
| Cabot cyan pigment surface modified with bisphosphonate group | 3.5% | Cabot cyan pigment surface modified with bisphosphonate group | 4.5% |
| Polymeric additive | 0.5% | Polymeric additive | 0.5% |
| 1,3-propanediol | 10.0% | 1,3-propanediol | 9.0% |
| Trimethylolpropane | 2.0% | 1,2-propanediol | 9.0% |
| 1-(2hydroxyethyl)-2-Pyrrolidone | 6.0% | Polyol ® 3165 | 2.0% |
| Polyol ® 3165 | 2.0% | | |
| Surfynol ® 465 | 0.75% | Surfynol ® 465 | 0.75% |
| Biocide | 0.15% | Biocide | 0.15% |

What is claimed is:

1. An aqueous cyan inkjet ink composition for use in ink jet printers comprising:
   (a) from about 1.0% to about 5.0% by weight, based on the total weight of the cyan inkjet ink composition, of a self-dispersed cyan pigment;
   (b) from about 15.0% to about 25.0% by weight, based on the total weight of the cyan inkjet ink composition, of a cosolvent mixture having:
      (1) a $C_2$-$C_8$ terminal alkanediol or a mixture thereof;
      (2) a polyol/polyalkylene oxide condensate having the formula

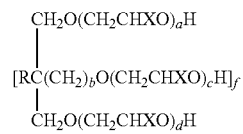

wherein X is H or $C_1$-$C_6$ alkyl, R is H, $C_1$-$C_6$ alkyl or $CH_2O(CH_2CH_2O)_eH$, b is 0 or 1, a+d+f (c+e) is from about 2 to about 100, and f is from about 1 to about 6;
      (3) a cyclic amide or its derivative;
      (4) a trihydric alcohol;
   (c) from about 0.5% to about 2.0% by weight, based on the total weight of the cyan inkjet ink composition, of a surfactant;

(d) from about 0.1% to about 2.0% by weight, based on the total weight of the cyan inkjet ink composition, of a polymeric additive; and (e) the balance an aqueous carrier, wherein the ink has excellent printhead maintenance, startup, print quality and minimized kogation.

2. The aqueous cyan inkjet ink composition according to claim 1 wherein the cosolvent mixture comprises:

(1) 1,3-propanediol present in the amount of about 10.0%, based on the total weight of the cyan inkjet ink composition;

(2) polyol/alkylene oxide condensate wherein X is hydrogen, R is $C_2H_5$, b is 1, f is 1, and a+d+f (c+e) is 14-18, present in the amount of about 2.0%, based on the total weight of the cyan inkjet ink composition;

(3) 1-(2-hydroxyethyl)-2-pyrrolidone present in the amount of about 6.0%, based on the total weight of the cyan inkjet ink composition; and (4) trimethylolpropane present in the amount of about 2.0%, based on the total weight of the cyan inkjet ink composition.

3. The aqueous cyan inkjet ink composition of claim 1 wherein the self-dispersed cyan pigment is modified with bisphosphonate group.

4. The aqueous cyan inkjet ink composition of claim 1 wherein the surfactant is ethoxylated 2,4,7,9-tetramethyl-5-decyn-4,7-diol and is present in the amount of about 0.75%, based on the total weight of the cyan inkjet ink composition.

5. The aqueous cyan inkjet ink composition of claim 1 wherein the self-dispersed cyan pigment is present in the amount of about 3.0%, based on the total weight of the cyan inkjet ink composition.

6. The aqueous cyan inkjet ink composition of claim 1 wherein the polymeric additive is present in the amount of 0.5%, based on the total weight of the cyan inkjet ink composition.

7. The aqueous cyan inkjet ink composition of claim 1, wherein the polymeric additive contains at least three components: a hydrophilic component, a hydrophobic component, and a protective colloid component.

8. The aqueous cyan inkjet ink composition of claim 7 wherein the hydrophilic component is methacrylic acid, the hydrophobic component is polypropylene glycol nonylphenyl ether acrylate, and the protective colloid segment is poly (ethylene glycol) 2,4,6-tris-(1-phenylethyl)phenyl ether methacrylate.

9. The aqueous cyan inkjet ink composition of claim 8 wherein the molar ratio of the methacrylic acid to the polypropylene glycol nonylphenyl ether acrylate to the poly (ethylene glycol) 2,4,6-tris-(1-phenylethyl)phenyl ether methacrylate is 6.2:1:1.

10. The aqueous cyan inkjet ink composition of claim 8 wherein the molar ratio of the methacrylic acid to the polypropylene glycol nonylphenyl ether acrylate to the poly (ethylene glycol) 2,4,6-tris-(1-phenylethyl)phenyl ether methacrylate is 15:1:1.

11. The aqueous cyan inkjet ink composition of claim 1 further comprising a biocide.

12. The aqueous cyan inkjet ink composition according to claim 1 wherein the cosolvent mixture comprises:

(1) 1,3-propanediol present in the amount of about 10.0% based on the total weight of the cyan inkjet ink composition.

(2) polyol/alkylene oxide condensate wherein X is hydrogen, R is $C_2H$, b is 1, f is 1, and a+d+f(c+e) is 14-18, present in the amount of about 2.0% based on the total weight of the cyan inkjet ink composition.

(3) 1-(2-hydroxyethyl)-2-pyrrolidone present in the amount of about 6.0% based on the total weight of the cyan inkjet ink composition; and (4) glycerol present in the amount of about 2.0%, based on the total weight of the cyan inkjet ink composition.

* * * * *